United States Patent [19]
Holcomb et al.

[11] Patent Number: 5,939,694
[45] Date of Patent: Aug. 17, 1999

[54] CHECK-IN STATION

[75] Inventors: Glen Holcomb, Richland Hills, Tex.; Halvor Aase, Moss, Norway

[73] Assignee: VingCard AS, Norway

[21] Appl. No.: 08/966,004

[22] Filed: Nov. 7, 1997

Related U.S. Application Data

[60] Provisional application No. 60/030,635, Nov. 8, 1996.
[51] Int. Cl.[6] ....................................................... G06F 7/08
[52] U.S. Cl. ............................................ 235/381; 235/382
[58] Field of Search ...................................... 235/381, 382

[56] References Cited

U.S. PATENT DOCUMENTS 5,156,397  10/1992  Valenza, Jr. .............................. 235/381

Primary Examiner—Harold I. Pitts
Attorney, Agent, or Firm—Bierman Muserlian and Lucas

[57] ABSTRACT

The check-in station is a stand alone, vertically-oriented unit which generates key cards. The unit employs a touch screen connected to a processor and a card encoding unit. The touch screen, processor and card encoding unit are arranged in the unit so as to provide a compacted, user friendly machine.

6 Claims, 7 Drawing Sheets

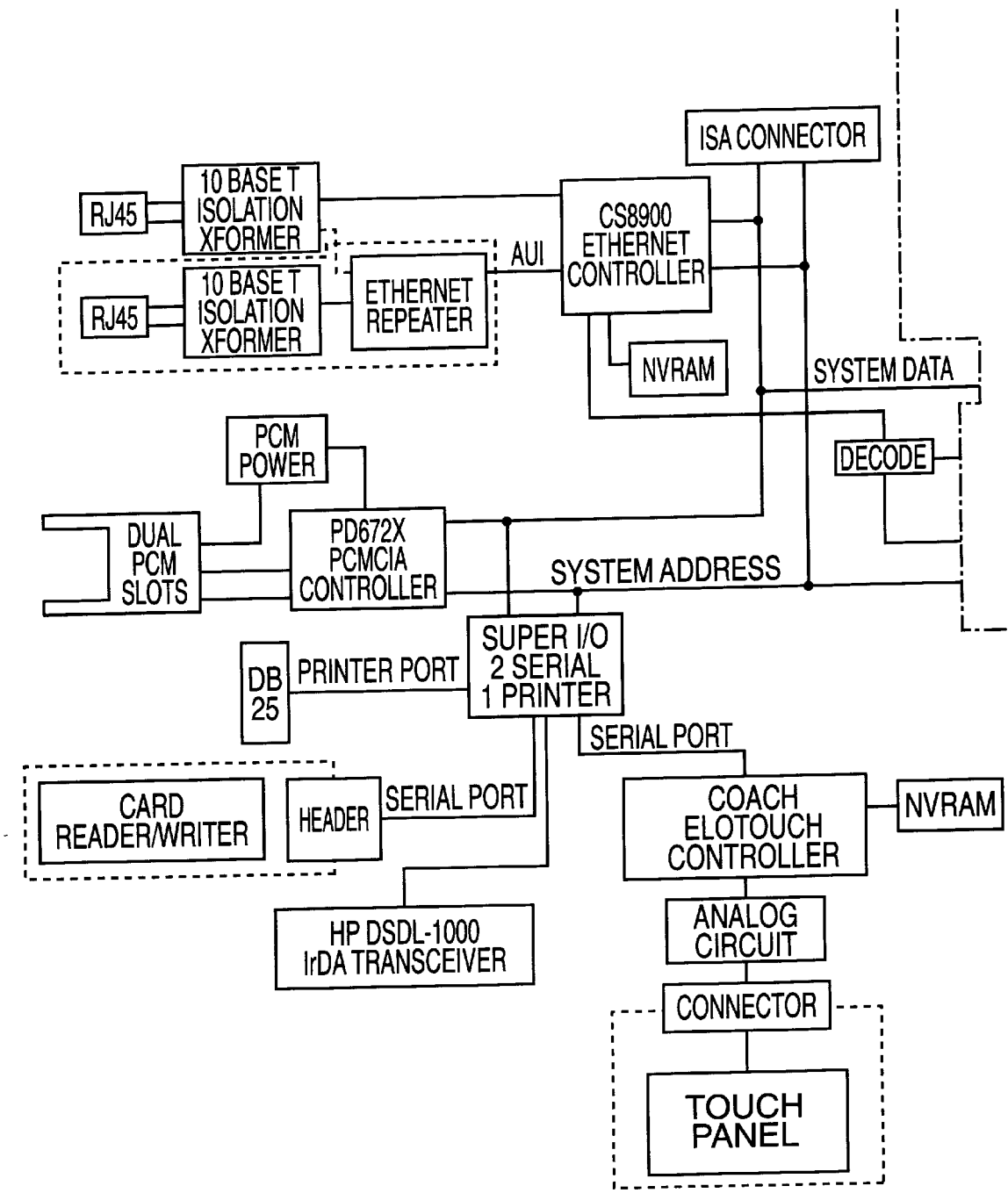
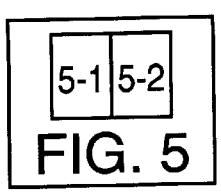
FIG. 5-1
FIG. 5

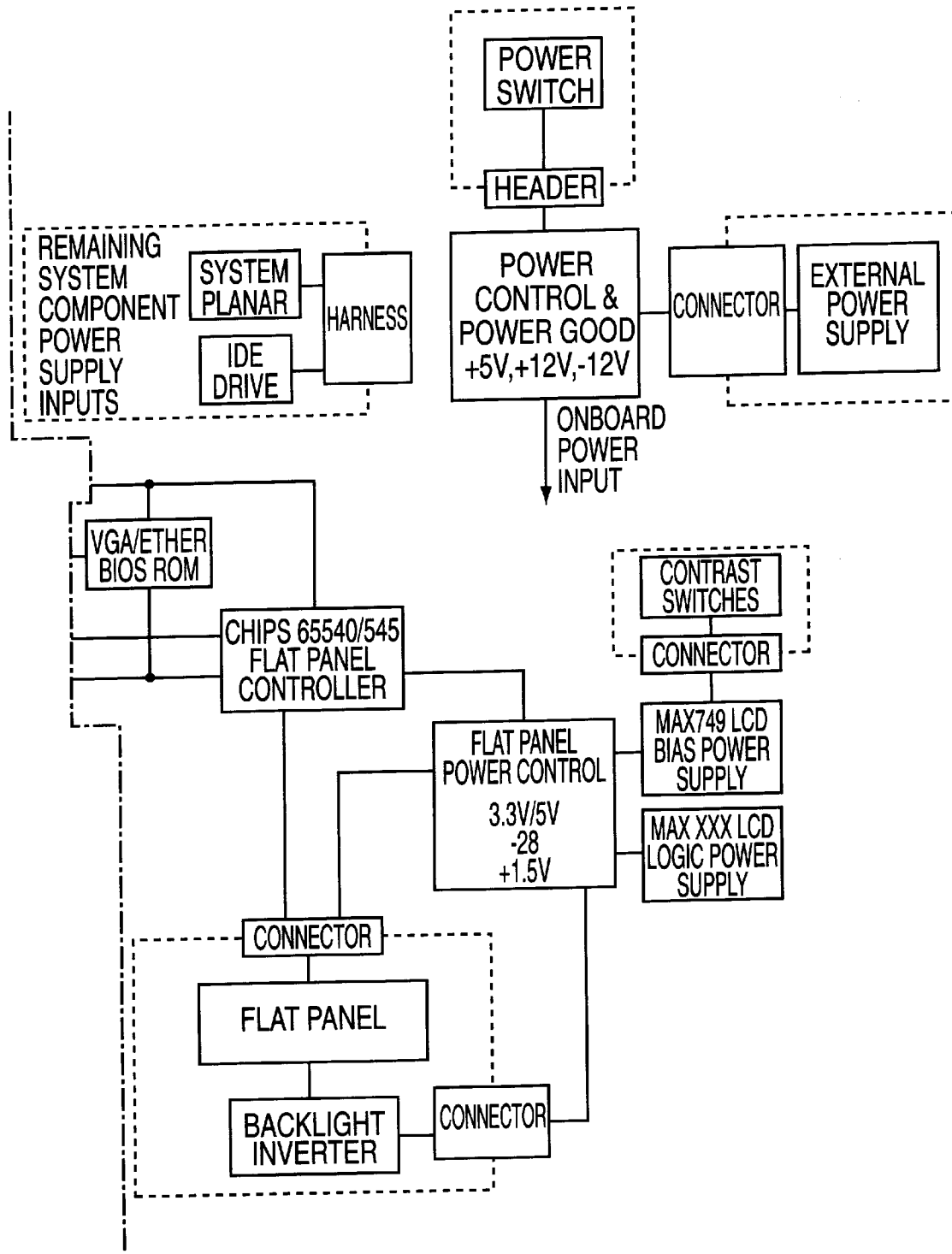
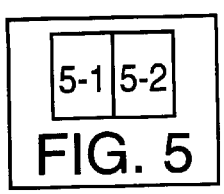
FIG. 5-2
FIG. 5

CHECK-IN STATION

This application claims benefit of Provisional Appln. No. 60/030,635 filed Nov. 8, 1996.

BACKGROUND OF THE INVENTION

The present invention relates to a check-in station for generating keys and, more particularly, to a check-in station for generating keys used in a hotel environment.

Conventionally, check-in stations at hotels comprises a processor (personal computer) for processing data, an encoder for encoding data on a key card, a screen for displaying information, and a keyboard for entering data into the processor. The data entered into the processor by the keyboard is viewed on the screen, and transmitted to the encoder for encoding onto the key card. Each one of these units, the processor, screen, keyboard and encoder, are interconnected by means of various cables and are all located at the front desk of the hotel.

A problem with this system is space, the keyboard, screen, processor and encoder each take up a large amount of space at the front desk. The front desk of a hotel usually has a limited amount of space and the clutter of the conventional check-in station detracts from the overall appearance of the hotel. There is a need to decrease the number of individual components used at the front desk and to increase the visual appearance of the check-in station.

Additionally, the operation of the keyboard and processor require a substantial amount of training. Since the hotel business has a high turnover of staff, there is a need for a check-in station that is easy to operate.

SUMMARY OF THE INVENTION

Applicants have now discovered that by combining a touch screen in conjunction with a processor and an encoder in a vertically oriented frame that the check-in station can be greatly simplified and attractive in appearance. More specifically, applicants have found that employing a vertically oriented frame in which a processor is mounted at the back of the frame, a touch screen is mounted at the front of the frame, and an encoder is mounted along a side of the frame, a single, vertically-oriented unit with a small footprint can be employed for a check-in station. Such a check-in station takes up less physical space at the front desk and not only simplifies the check-in process, but also provides a unit which is appealing to the eye. Furthermore, it has been found that by using a touch screen with an encoder and a processor in a single unit, the check-in station can operate independently of other check-in stations and greatly speed the time necessary to check-in a guest.

Broadly, the present invention is a check-in station for generating key cards comprising:
(a) a vertically-oriented frame having back, front and side surfaces;
(b) a processor positioned along the back surface of said frame;
(c) a touch screen positioned at the front surface of said frame and connected to said processor through which data is entered into said processor for processing check-in of a person;
(d) a card encoder positioned in said frame along one of said surfaces of said frame, said encoder connected to said processor, said encoder for encoding data onto a key card, for use by said person; and
(e) a base removably attached to said frame along one of said surfaces, for holding said frame in a vertically-oriented position.

The check-in station can be used in a hotel, motel, train, boat or any environment in which a guest is checked in and a key generated for use by the guest.

The check-in station of the present invention has a connector to allow a keyboard to be plugged into and communicate with the processor for programming or for retrieving data from the processor.

Preferably, the encoder is positioned along one of the vertical side surfaces so as to receive cards from the side on which it is positioned.

BRIEF DESCRIPTION OF THE DRAWINGS

FIG. 5 illustrates the functional specification of the unit.

DETAILED DESCRIPTION OF THE INVENTION

Figure 1A:
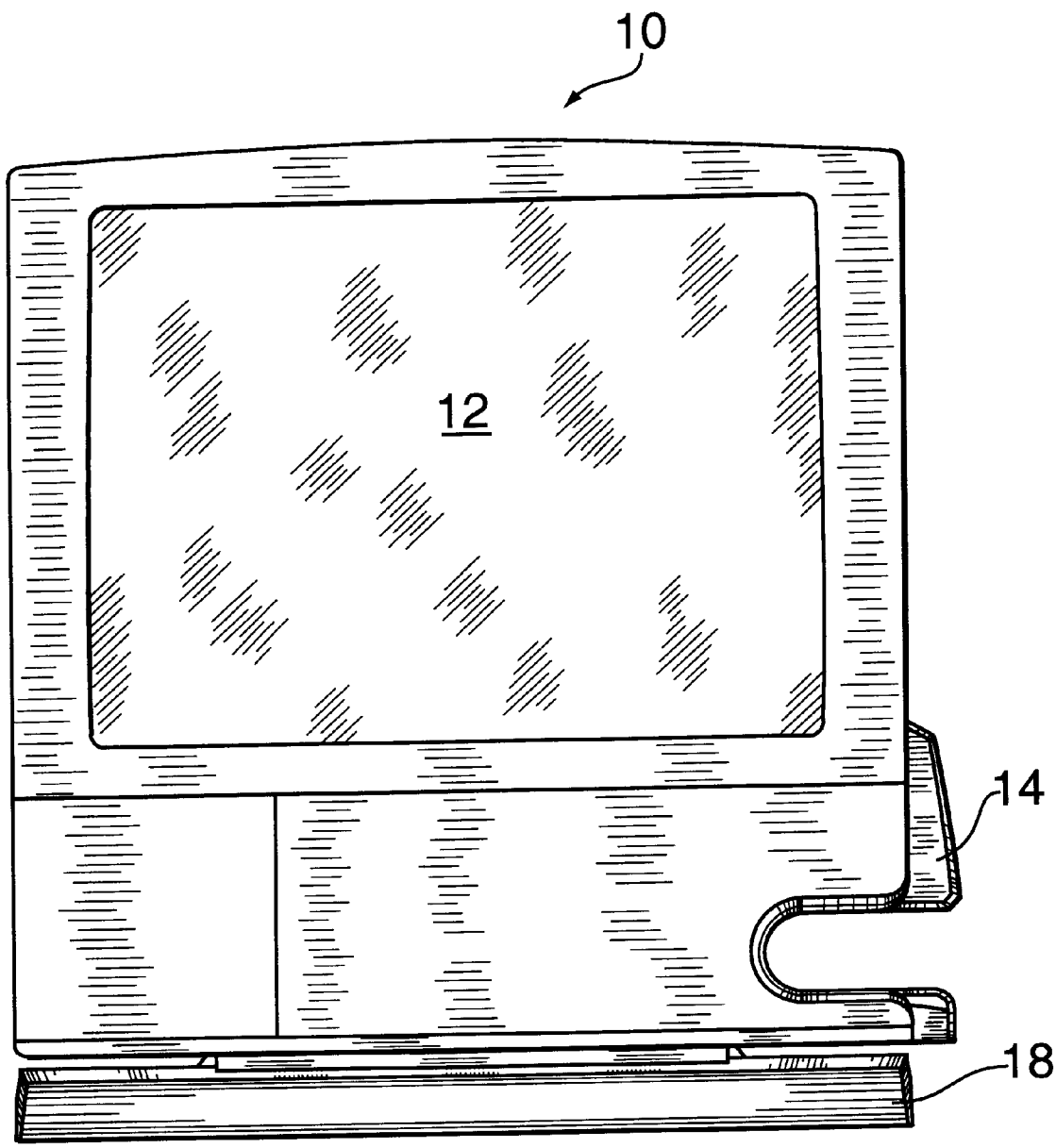
FIGS. 1A, 1B and 1C depict the vertically oriented frame of the present invention.
Figure 1C:
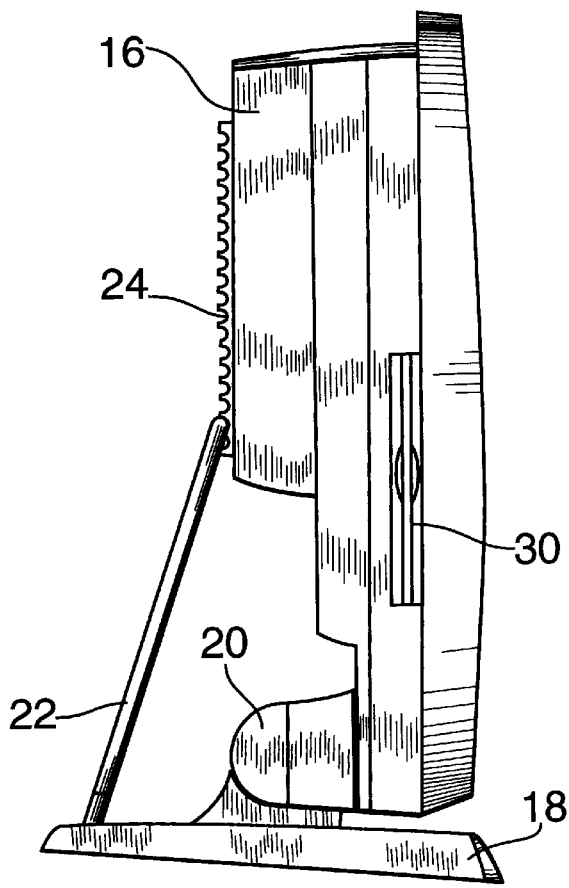
Figure 1B:
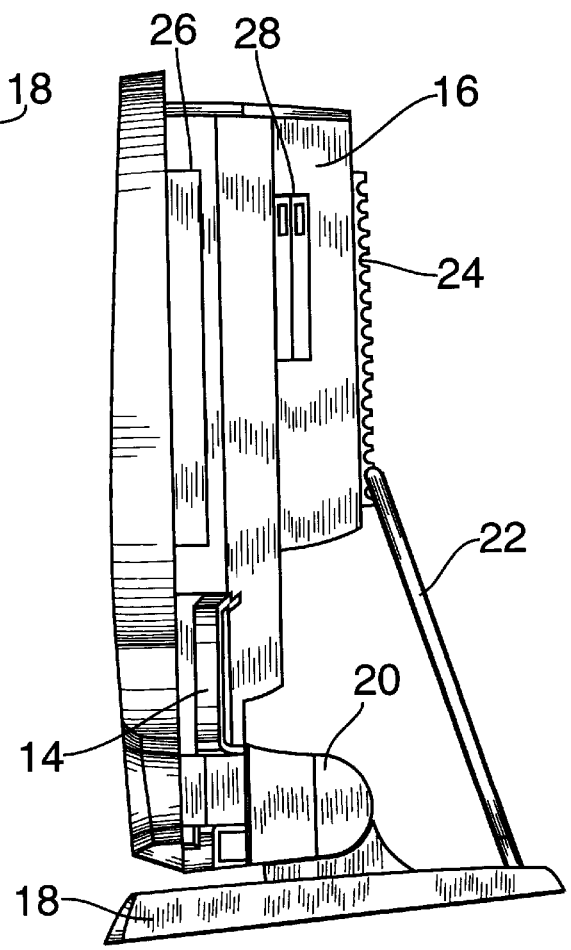

FIGS. 1A, 1B and 1C depict vertically oriented frame 10 in which touch screen 12 is positioned at the front of frame 10, encoder port 14 positioned in the lower right-hand corner of frame 10, a processor 16 positioned at the back of frame 10. Frame 10 is removably attached to base 18 such that frame 10 can be removed from base 18. Frame 10 is also movable with respect to base 10 such that it can be tilted forward and backward for ease of use by the operator because of hinge 20 and is secured in place by means of bar 22 and teeth 24.

The check-in station has a CD drive port 26, PCMCIA port 28 and floppy disk port 30.

The touch screen used in the present invention is conventional. Such touch screens operate by physical contact to the screen. The preferred touch screen is a touch LCD screen. The preferred screen is a full color, 12.1 inch (31 cm) backlit LCD screen with resistive touch screen overlay. The touch screen includes the LCD flat panel display controller with required power supply electronics, and a touch screen overlay controller. Suitable flat panel display controllers include C&T 65540 Flat Panel Controller (up to 1024×768 16 color with 512K display memory). Suitable power supply electronics for the flat panel display controller include a flat panel logic power supply logic power supply such as Maxim MAX 649 Power Supply Controller (configured for either 5V/3.3V and enabled by the C&T 65540 Flat Panel Controller), National Semiconductor's LM 2576 (5V/3.3V switch mode power supply enabled by C&T 65540 Flat Panel Controller); a flat panel BIAS power supply such as a Maxim MAX 749 power supply controller (−15V to −28V adjustable at 35 mA) for the negative bias or a Dallas Semiconductor DS1669 Digital Plot (+0.8VDC to +2.8VDC adjustable enabled by C&T 65540), the Flat Panel Controller for the positive bias; and a flat panel backlight power such as a Flat Panel Backlight Inventor Power Control (+12V enabled by C&T 65540 Flat Panel Controller). It allows for additional display to be added. The touch screen controller is suitably an Elotouch E 271-Coach Controller with serial interface and equipped with an on board NV Ram.

The encoder is any conventional encoder. The preferred encoder can write and read on magnetic cards. More preferably, the encoder is a three-track, read, write, verify, encoder. The encoder can work by manual insertion or be automatic. Encoders that work on smart cards can also be used in the present invention. Smart cards are cards that contain computer chips. It should be appreciated that, although the term "card" as used herein, the item is more generically described as a key and can simply take the form of a card or a conventional key.

The processor used in the present invention is any conventional processor which is capable of operating the various software necessary to run the touch screen and the encoder. Such processors conventionally contain a computer mother board, a daughter card, and have various attachments for the peripherals. Such peripherals include the touch screen and its various components, CD rom drive, floppy disk drive, a PCMCIA connector, a modem, serial ports, printer ports, keyboard ports, and an IRDA port. It is also preferred that the processor contain a ethernet port. The ethernet port is used to connect a plurality of the check-in stations. The preferred processor is an Intel 486/33 MHz, with 8 MB RAM as standard and 420 MB internal hard disk. There are STANDARD PORTS; 2 serial ports, 1 parallel port for printer, integrated 10 bT ethernet port, PC-card type III slot, IRDA, external VGA monitor port, mouse and keyboard ports. The preferred OPERATING SYSTEM is Windows 95. The preferred MODEM is 28.8 kbps V.34 standard internal modem.

To enable the communication ports and the printer port, a Super I/O such as a National 87334 Super I/O with a printer port connector terminated to a PCB mounted DB 25 LPT. The communication port is interfaced with an Insert Card Reader/Writer and can be used for an IrDA. When IrDA is enabled the Ir Emitter and Detector are also enabled. While the IrDA is enabled, the Reader/Writer is disabled. The IrDA port is embedded in the Super I/O and the communication port is used to interface to the Elotouch Screen Controller of the touch screen.

The ethernet controller is suitably a Crystal CS 8900 10-BaseT Controller.

A suitable PCMCIA controller for the two slots is Cirrus PD 6721 PCMCIA Controller.

A suitable floppy drive includes TEAC's Model FD-04XF (3.5", 2HD). Suitable CD Rom include TEAC's 4X flat ribbon or mylar cable. Suitable hard drives include Seagate ST94204G (420.8 MB Marathon SL) and Western Digital AL2540 (540 MB EIDE). Suitable motherboards include a DFI G586-IPC (Pentium 82430HX PCI). Suitable daughterboards are obtained from Merrimac.

Figure 2:
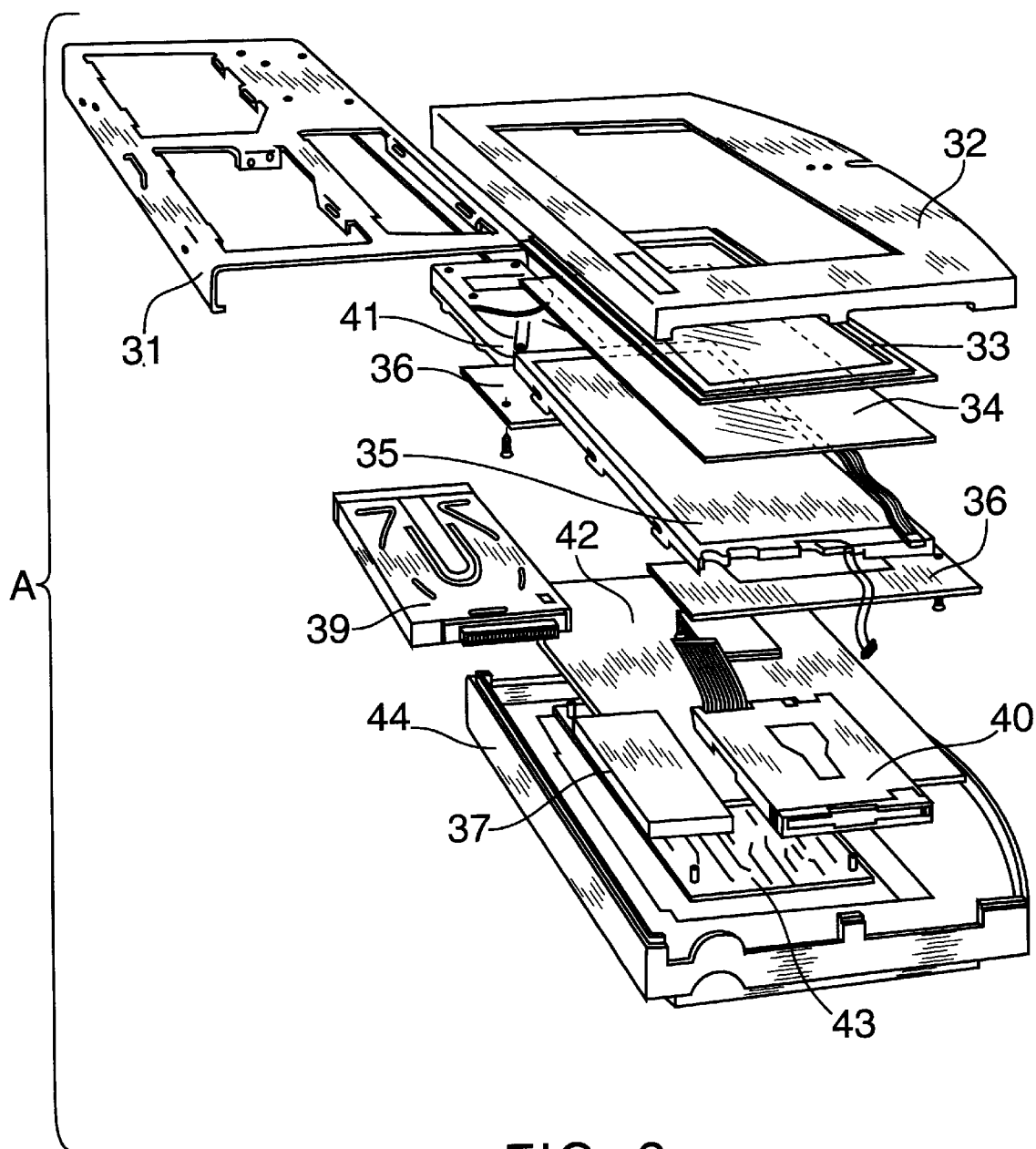
FIG. 2 is an exploded view of the elements of the vertically oriented check-in station of the present invention.

FIG. 2 illustrates an exploded view of the vertically oriented check-in station A of the present invention without its base. In descending order, metal cage 31 holds the various units inside the frame. Upper housing 32 which forms the outside front cover is preferably made of plastic such as ABS plastic by an injection molding technique. Next, LCD Bezel 33 is positioned. LCD Bezel 33 is suitably made from plastic, such as ABS plastic, by means of injection molding. Next, touch screen 34 is mounted in the frame which is followed by display 35. Suitable displays include Sharp's LM64P89 (Monochrome), LM64C35PX (Passive), LQ12DO1(TFT-LCD), and Kyocera's KCS6448JSTT-X5 (Passive), KCS8060FSTT-XL (Passive) and KCB8060HSTT-X2 (Passive). LCD mounting bracket 36 holds units 33, 34 and 35 together. Read/Write unit 37 (encoder) is positioned next to floppy drive 39 and above CD Rom 40. Read/Write unit 37, floppy drive 39 and CD Rom 40 are preferably positioned on the righthand side of the frame while hard drive 41 is positioned on the lefthand side of the frame. Motherboard 42 is positioned behind the other units and in front of daughterboard 43. Lower housing 44 forms the back of the frame and the other half of the outside cover of the frame.

Figure 3B:
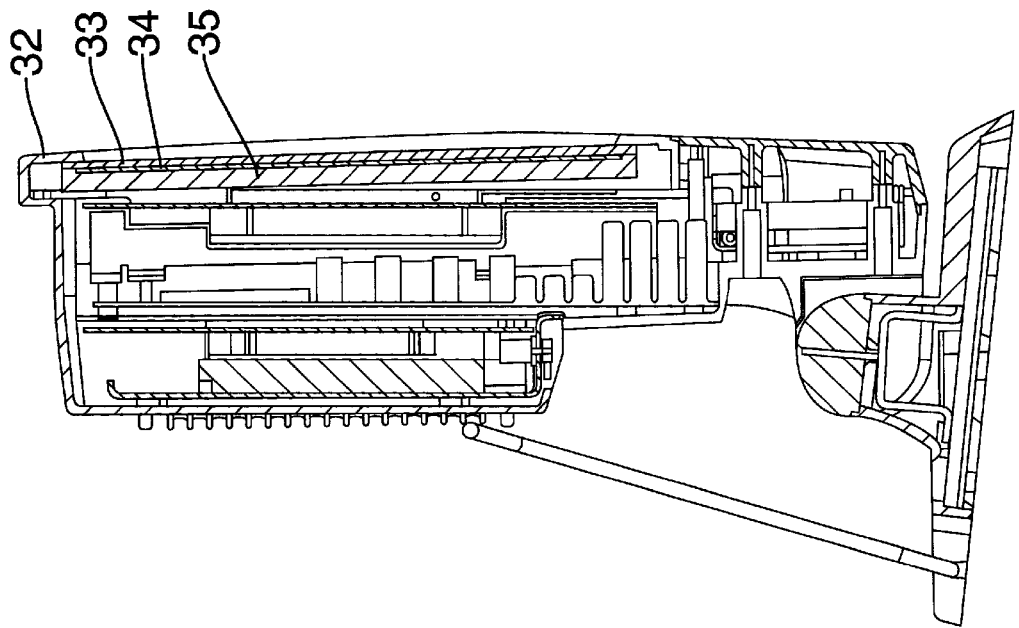
FIGS. 3A and 3B illustrate side views of the unit.
Figure 3A:
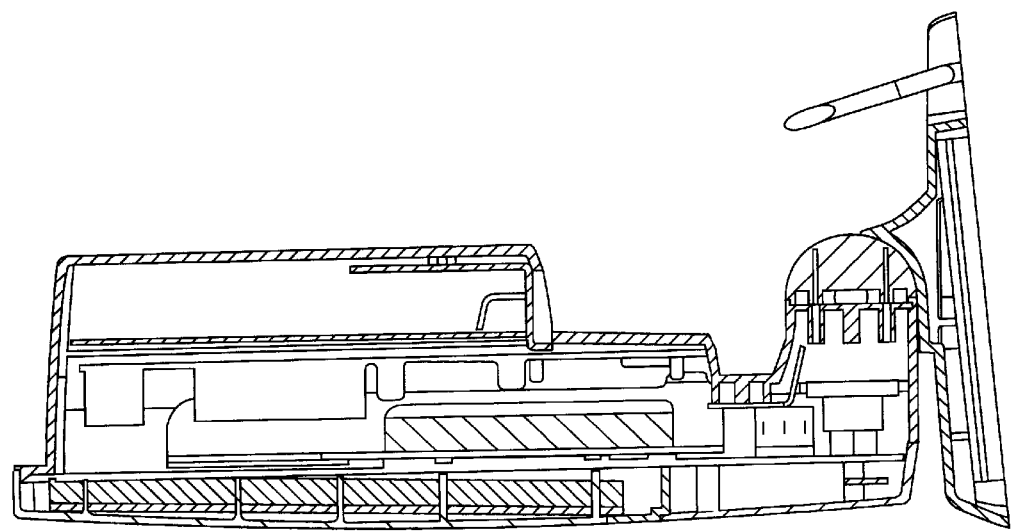

FIGS. 3A and 3B illustrate a side view of the assembled unit with its base. The reference characters in FIGS. 3A and 3B are labelled as in FIGS. 1A, 1B, 1C and 2.

Figure 4:
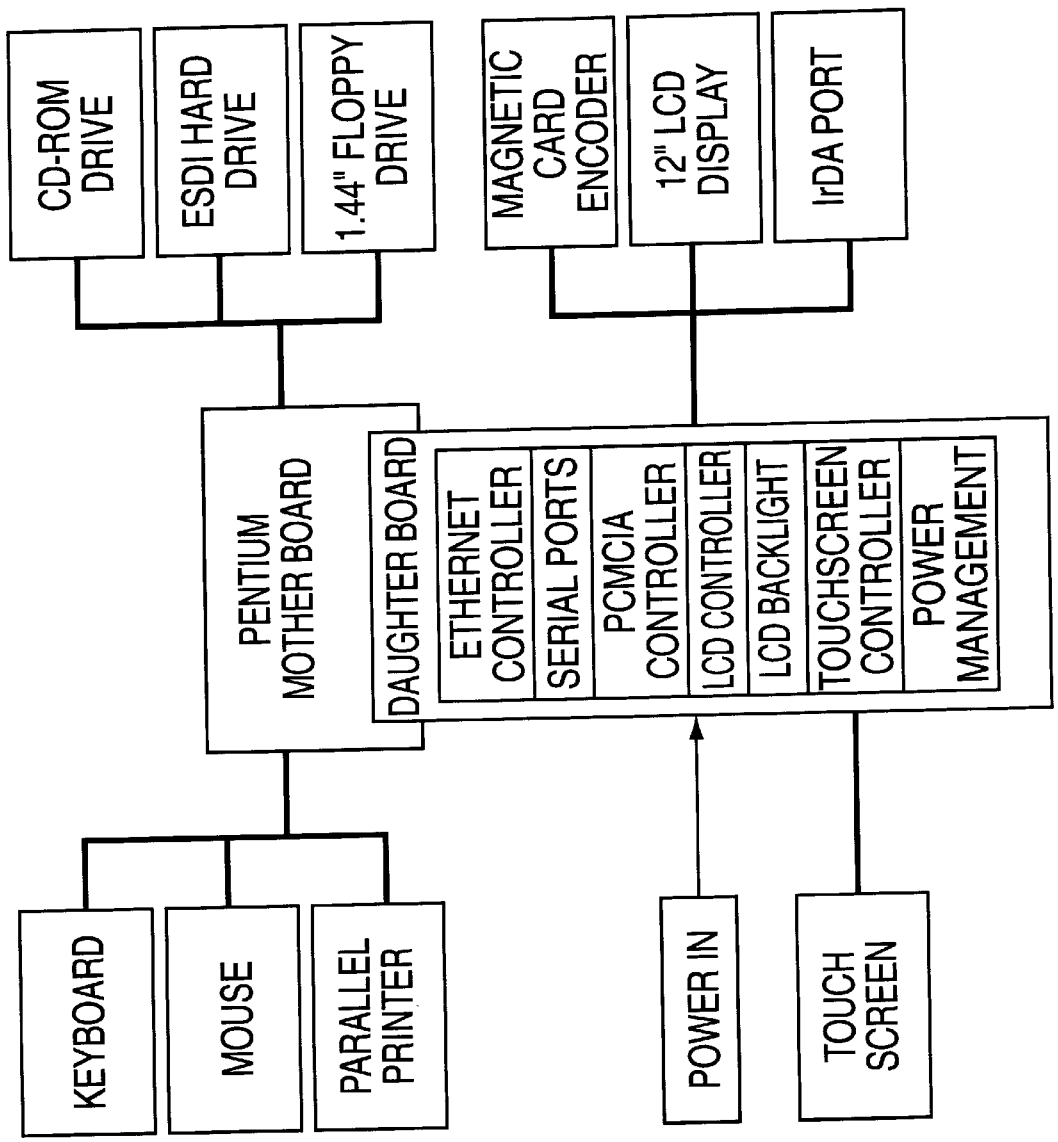
FIG. 4 illustrates the overall architecture for the unit.

FIG. 4 illustrates the overall architecture of the unit. The blocks have been appropriately labelled.

FIG. 5 illustrates the frunctional specifications of the unit in block diagram format. The blocks have been appropriately labelled.

The daughter card is such that it is able to bring all the pieces together and allows them to function as a unit.

It should be appreciated that one or more check-in units as herein disclosed can be employed. Thus, the check-in unit as herein disclosed is a stand alone unit or a unit used in a network of check-in stations. As can be appreciated, each check-in station is a stand alone unit.

The touch screen is designed to allow for encoding of the following items onto the key:

room number;

card expiration, both date and time;

card initiation, both date and time;

special door lists such as the exercise room, the lounge, the disco

Additionally, the touch screen allows for different screens depending on the type of key to be generated. For instance, guest keys, employee keys, and security keys.

What is claimed is:

1. A check-in station for generating key cards comprising:
   (a) a vertically oriented frame having back, front and side surfaces;
   (b) a processor positioned along the back surface of said frame;
   (c) a touch screen positioned along the front surface of said frame and connected to said processor through which data is entered into said processor for processing checking in of a person;
   (d) a card encoder positioned in said frame along one of said surfaces of said frame, said encoder connected to said processor, said encoder for encoding data onto a key card for use by said person; and
   (e) a base removably attached to said frame along one of said surfaces for holding said frame in a vertically-oriented position.

2. The check-in station of claim 1 wherein said touch screen is a monochrome backlit LCD with resistive screen overlay.

3. The check-in station of claim 1 further comprising a modem positioned in said frame and connected to said processor.

4. The check-in station of claim 1 further comprising a keyboard port connected to said processor and mounted in said frame and an external keyboard connected to said processor through said keyboard port.

5. The check-in station of claim 1 further comprising a printer port connected to said processor and mounted in said frame and an external printer connected to said processor through said printer port.

6. The check-in station of claim 1 further comprising an ethernet port mounted in said frame and connected to said processor such that a plurality of check-in stations are connected one to the other through their respective ethernet port.

* * * * *